US008249256B2

(12) United States Patent
Korus et al.

(10) Patent No.: US 8,249,256 B2
(45) Date of Patent: Aug. 21, 2012

(54) METHOD FOR PROVIDING FAST SECURE HANDOFF IN A WIRELESS MESH NETWORK

(75) Inventors: Michael F. Korus, Eden Prairie, MN (US); Ohad Shatil, Kenosha, WI (US)

(73) Assignee: Motorola Solutions, Inc., Schaumburg, IL (US)

( * ) Notice: Subject to any disclaimer, the term of this patent is extended or adjusted under 35 U.S.C. 154(b) by 887 days.

(21) Appl. No.: 11/935,513

(22) Filed: Nov. 6, 2007

(65) Prior Publication Data

US 2009/0116647 A1 May 7, 2009

(51) Int. Cl.
*H04K 1/00* (2006.01)
(52) U.S. Cl. ......... 380/272; 380/247; 713/171; 370/331
(58) Field of Classification Search .................. 380/272, 380/331
See application file for complete search history.

(56) References Cited

U.S. PATENT DOCUMENTS

| 7,499,547 | B2* | 3/2009 | Zheng et al. .................. 380/247 |
| 7,787,627 | B2* | 8/2010 | Sood et al. ..................... 380/277 |
| 8,023,478 | B2* | 9/2011 | Cam-Winget et al. ........ 370/338 |
| 8,037,305 | B2* | 10/2011 | Rahman et al. ............... 713/168 |
| 2006/0067526 | A1 | 3/2006 | Faccin et al. |
| 2007/0206537 | A1* | 9/2007 | Cam-Winget et al. ........ 370/331 |
| 2007/0250713 | A1* | 10/2007 | Rahman et al. ............... 713/171 |
| 2008/0065884 | A1 | 3/2008 | Emeott |
| 2008/0072047 | A1* | 3/2008 | Sarikaya et al. .............. 713/171 |

FOREIGN PATENT DOCUMENTS

WO 2008030667 A2 3/2008

OTHER PUBLICATIONS

Draft Amendment to IEEE Standard 802.11r/D2.0; Amendment 2: Fast BSS Transition; 5.4.8.2-Fast BSS Transition Architecture Description; pp. 7-9; Mar. 2006.
NIST—Guide to IEEE 802.11i: Establishing Robust Security Networks (Draft); Frankel et al; Chapter 4: Security Framework for Robust Security Networks—15pp; Chapter 5: Robust Security Networks Principles of Operation—23pp; Chapter 11: Future Directions—1 p; Jun. 2006.
IEEE P802.11-05/0875r1—Wireless LANs—TGr Key Holder IE Text; 1p; Sep. 2005.
IEEE P802.11s/D1.0, "Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking." IEEE, Nov. 2006, 243 pages.

(Continued)

*Primary Examiner* — Peter Poltorak
*Assistant Examiner* — Amare F Tabor
(74) *Attorney, Agent, or Firm* — Randi L. Karpinia

(57) ABSTRACT

Disclosed is a method for providing fast secure handoff in a wireless mesh network. The method comprises configuring multiple first level key holders (R0KHs) within a radio access network to which supplicants within the multi-hop wireless mesh network are capable of establishing a security association, configuring a common mobility domain identifier within the first level key holders of a mobility domain, and propagating identity of a first level key holder and the mobility domain identifier through the wireless mesh network to enable the supplicants within the mobility domain to perform fast secure handoff.

15 Claims, 8 Drawing Sheets

OTHER PUBLICATIONS

Sarikaya R. Jaksa Huawei—"CAPWAP Roaming Protocol in 802.11R Domains" Text—Drafts-Sarujata-Capwap-fastbss; IETF Standard-Working-Draft, Internet engineering Task Force, XP015048496—Oct. 2006—30 pages.

P802.22r D7.0—Draft Standard for Information Techology Telecommunications and information exchange between systems—Local and metropolitan area networks—specific requirements—Part II: Wireless LAN Medium Access Control (MAC) and Physical Layer (PHY) specifications—Amendment 2: Fast BSS Transition—Section 8.5.1.5.1-8.5.1.5.5 Jul. 2007—10 pp.

International Search Report with Written Opinion—PCT/US2008/080082—Mailed Apr. 28, 2009—10 Pages.

International Preliminary Report on Patentability for International Application No. PCT/US2008/080082, mailed on May 11, 2010.

English Language Translation of Office Action for Korean Patent Application No. 10-2010-7012355 mailed on Sep. 15, 2011.

* cited by examiner

US 8,249,256 B2

METHOD FOR PROVIDING FAST SECURE HANDOFF IN A WIRELESS MESH NETWORK

FIELD OF THE DISCLOSURE

The present disclosure relates generally to wireless communications and more particularly to a method for providing fast secure handoff in a wireless mesh network.

BACKGROUND

Mesh networks are self-forming, multi-hop networks including a number of nodes which can operate with or without any fixed infrastructure, and in some cases the mesh network is formed entirely of mobile nodes. A mesh network typically includes a number of geographically-distributed, potentially mobile nodes which are wirelessly connected to each other by one or more logical links (e.g., radio frequency communication channels). The nodes can be fixed or mobile and can communicate with each other over a wireless media with or without the support of an infrastructure-based or wired network. Logical links between these nodes can change dynamically in an arbitrary manner as existing nodes move within the mesh network, as new nodes join or enter the mesh network, or as existing nodes leave or exit the mesh network. A single-hop logical link can only exist between two nodes when they are within direct communication range. A multi-hop logical link can only exist between two nodes whenever a set of single-hop logical links can be used to construct a path between the nodes. Such multi-hop logical links are either instantaneously coherent (e.g. all single-hop links are present at the same time) or deferred coherent (e.g. all single-hop links are expected to be present or were present over a period of time).

A mesh node typically includes an interface such as an Institute of Electrical and Electronics Engineers (IEEE 802.11) interface which continuously scans for other nodes in the mesh network. IEEE 802.11 communication systems allow for "proximity-based" communications. For example, when two nodes are mobile within a geographic area, those nodes can communicate within a range of each other, such as a range of fifty (50) meters or one hundred sixty five (165) feet of each other. Using mesh routing protocols, logical routes are established between the mesh nodes and the fixed infrastructure (using one or more wireless hops) for access to data networks and services provided within the fixed infrastructure. Security is also established within the mesh network to protect data content from eavesdropping, modification and masquerading threats common in wireless networks.

Wireless networks such as mesh based networks, particularly the municipal and public safety markets utilizing mesh based networks for wide area mobile broadband coverage, require secure, fast handoff solutions. Large wide area mesh networks are typically segmented into manageable domains. IEEE 802.11r refers to these manageable domains as mobility domains. Mobility domains are groupings of access points that together provide an opportunity for fast handoff due to hierarchical security architecture within the mobility domain. In some cases, each of the mobility domains is mapped to an Internet Protocol (IP) subnet.

Existing solutions for secure, fast handoff are defined in IEEE 802.11i and IEEE 802.11r. However, both of these standards are limited in scope to the indoor enterprise architecture, that is, limited to a wired access point communicating with an 802.11 STA. Further, the enterprise model assumes the access point is wired directly to an enterprise network. Both 802.11i and 802.11r standards have drawbacks to their centralized key hierarchy approach with respect to high availability and fast handoff.

The limitations in the existing standards result in potential single point of failure of the key-heirarchy within a mobility domain when a single key level holder (R0KH) component is servicing the entire mobility domain. Further, the single point of failure can result in non-availability of security services to new devices roaming into the mobility domain or to devices in which security associations expire. In such cases, the devices will not have access to the network. Another limitation with the current approach is that R0KH handoff is significantly diminished when the physical location of the R0KH is outside, or not in control of the radio access network. Therefore, there is a need for a solution which addresses the above limitations of the existing standards.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
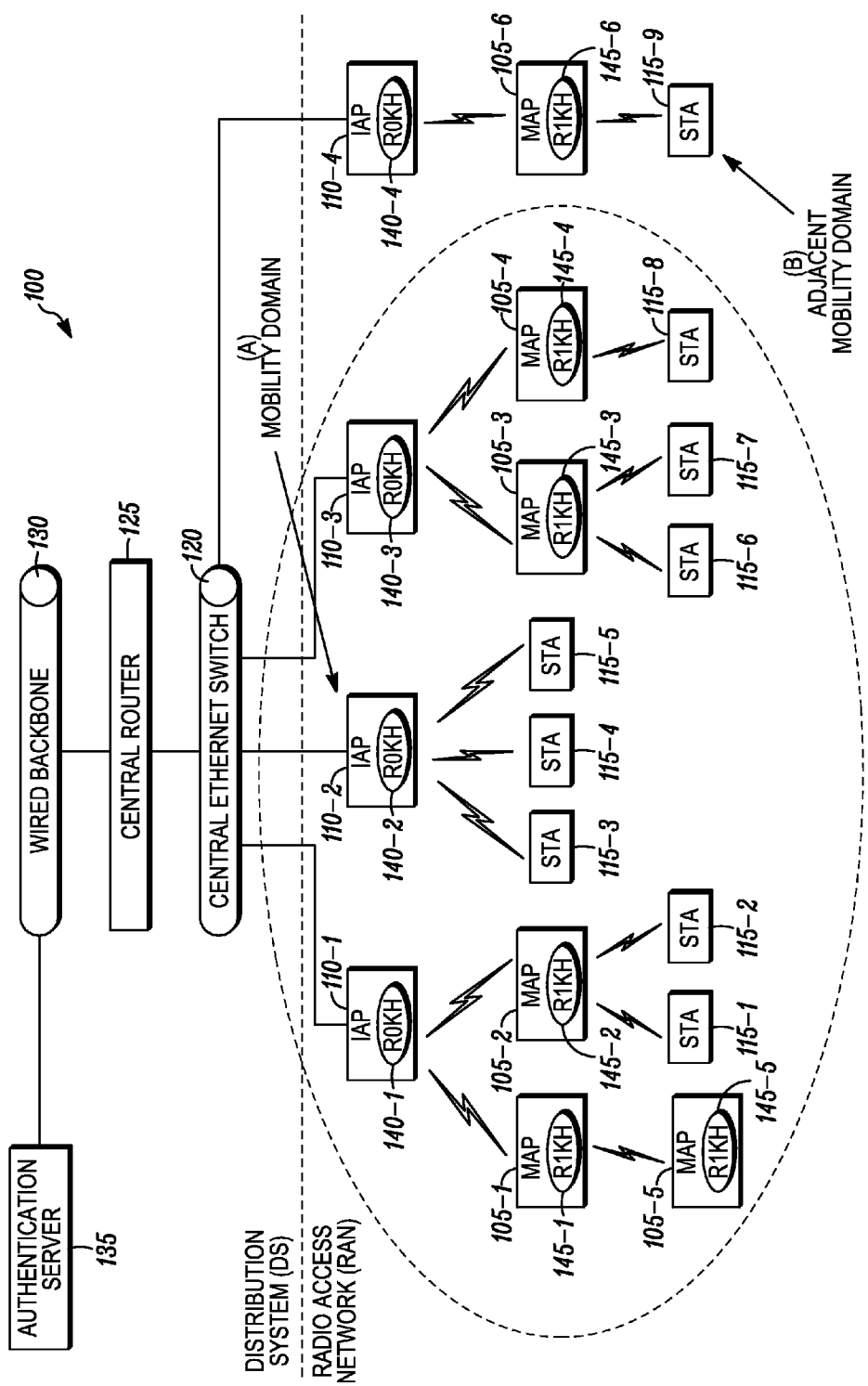
FIG. 1 is a block diagram of a communication network in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before describing in detail embodiments that are in accordance with the present invention, it should be observed that the embodiments reside primarily in combinations of method steps and system components related to providing fast secure handoff in a wireless mesh network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of providing fast secure handoff in a wireless mesh network. The non-processor circuits may include, but are not limited to, a radio receiver, a radio transmitter, signal drivers, clock circuits, power source circuits, and user input devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Any embodiment described herein is not necessarily to be construed as preferred or advantageous over other embodiments. All of the embodiments described in this Detailed Description are illustrative provided to enable persons skilled in the art to make or use the invention and not to limit the scope of the invention which is defined by the claims.

FIG. 1 is a block diagram illustrating an example communication network employing a method in accordance with some embodiments. Specifically, illustrates a wireless mesh network 100. The wireless mesh network 100, for example, can be a mesh enabled architecture (MEA) network or an 802.11 network (i.e. 802.11a, 802.11b, 802.11g, or 802.11s). It will be appreciated by those of ordinary skill in the art that the wireless mesh network 100 in accordance with the present invention can alternatively comprise any packetized communication network where packets are forwarded across multiple wireless hops. For example, the wireless mesh network 100 can be a network utilizing packet data protocols such as OFDMA (orthogonal frequency division multiple access), TDMA (time division multiple access), GPRS (General Packet Radio Service) and EGPRS (Enhanced GPRS). Additionally, each wireless hop of the wireless mesh network 100 may either employ the same packet data protocol as the other hops, or a unique packet data protocol per hop.

Architecture of Wireless Mesh Network with Distributed R0KHs

As illustrated in FIG. 1, the wireless mesh network 100 includes one or more mesh access points 105-$n$ (for example, MAPs 105-1 through 105-6) which are used to route data packets from one or more intelligent access points 110-$n$ (for example, IAPs 110-1 through 110-4) to one or more wireless subscriber devices 105-$n$ or 115-$n$ (for example, STAs 115-1 through 115-9, or MAPs 105-1 through 105-6). It will be appreciated by those of ordinary skill in the art that any number of mesh access points 105-$n$, intelligent access points 110-$n$, and wireless subscriber devices 115-$n$ can be utilized within the wireless mesh network 100 in accordance with the embodiments of the present invention, and that the quantity of such devices in FIG. 1 are for illustrative purposes only. The one or more IAPs 110-$n$ then route the packets to a central ethernet switch 120 communicatively coupled to a central router 125. The central router 125 is coupled to via a wired backbone 130 to an authentication server 135. Although only the paths from the subscriber devices 115-$n$ (STAs) to the wired network (i.e. central ethernet switch 120) is shown, it will be appreciated by those of ordinary skill in the art that meshed connections can be established as long as two neighboring devices such as subscriber devices 115-$n$ can communicate with each other.

A mesh enabled access point refers to a mobile or fixed device provisioned with both mesh functionality and access point functionality, wherein the mesh functionality allows neighboring devices to join the mesh e.g. wireless mesh network 100 using mesh routing, and the access point functionality supports 802.11 STA access. As used herein, the term "intelligent access point" refers to a fixed mesh enabled access point that is wired to a distribution system (i.e. connected to the wired backhaul). In one embodiment, the IAPs 110 can be configured as an IEEE 802.11s mesh portal (MPP). The term "mesh access point" refers to a mobile or fixed device that does not have a wired connection to the distribution system. In other words, the mesh access point has only wireless connection to the distribution system via the IAPs.

The radio access network (RAN) forming the MAPs 105, IAPs 110 and STAs 115 of the wireless mesh network 100 is configured with multiple R0KHs 140-$n$ (also referred to as first level key holders or top level key holders or level zero key holders). In the present invention, each of the IAPs 110-1 through 110-4 is associated with one of the R0KHs 140-$n$ (R0KHs 140-1 through 140-4) as shown in FIG. 1. The present invention adapts the 802.11r key heirarchy into the wireless mesh network 100. As it will be appreciated by a person skilled in the art, the first level key holder 140-$n$ derives and holds the top pairwise master key (PMK_0) for each supplicant wireless device (MAPs 105 or STAs 115) after the authentication process. In the present invention, all the MAPs 105-$n$ take the role of second level key holders (R1KHs) 145-$n$ (for example R1KHs 145-1 through 145-6) and receive the next level key holder pairwise master key (PMK_1) from the first level key holder 140. The link level data protection key can be derived from PMK_1 via a 4-way handshaking such as an 802.11 four-way handshaking. It will be appreciated by those of ordinary skill in the art that any number of key holders and levels of key holders can be utilized within the radio access network (RAN) in accordance with the embodiments of the present invention, and that the quantity of such devices in FIG. 1 are for illustrative purposes only.

In the present invention, as shown in FIG. 1, some of the R0KHs 140-n, for example R0KH 140-1 through 140-3 within the wireless mesh network 100 are configured with a common mobility domain identifier to constitute a mobility domain (shown as mobility domain A). For example, the wireless mesh network 100 of FIG. 1 comprises mobility domain A including IAPs 110-1 through 110-3, MAPs 105-1 through 105-5 and STAs 115-1 through 115-8, and mobility domain B (shown as adjacent mobility domain B) including IAP 110-4, MAP 105-6 and STA 115-9. It is important to note that each of the MAPs 105 and IAPs 110 that is configured with a common mobility domain identifier propagates the common mobility domain identifier to enable wireless subscribes devices 115 or mobile MAPs 105 moving within the mobility domain to establish security association with the mobility domain.

The authentication server 135 works to provide authentication services to the R0KHs 140 and will be described hereinafter. In general, the authentication server 135 performs the authentication function necessary to check the credentials of a supplicant device on behalf of the authenticator and indicates whether the supplicant is authorized to access the authenticator's services. In one embodiment of the present invention, the authentication server 135 is located in a wired network section where physical security of the host can be provided. For example, the authentication server 135 can be an extensible authentication protocol-Tunneled Transport Layer Security/extensible authentication protocol-transport layer protocol (EAP-TTLS/EAP-TLS) enabled remote authentications dial-in user service (RADIUS) server providing centralized authentication.

The subscriber devices 115-n or 105-n in the wireless mesh network 100 may be required to send and receive encrypted data. Any device within the wireless mesh network 100 requiring/desiring access to the services offered by the authenticator's system is referred to as a supplicant. In one example, as shown in FIG. 1, the MAP 105-5 acts as a supplicant. A device that authenticates another device (supplicant) which requires/desires using the services protected by the authenticator is referred to as an authenticator. The authenticator enforces access control based on the authentication result.

Each node (MAPs 105-n, IAPs 110-n, and STAs 115-n) in the wireless mesh network 100 is authenticated to the wireless mesh network 100 before it joins the wireless mesh network 100. The credentials for the authentication can be based on, for example, public key technologies, shared key technologies, a password, a subscriber identity module (SIM) card identification (I.D.) or other I.D. which is unique to the particular node and is stored at the authentication server 135. Each node uses this relationship with the authentication server 135 to authenticate to a one-hop secured meshed MAP 105 or IAP 110 which has established a secure connection to the R0KH 140. The R0KH 140 will use the authentication services provided by the authentication server 135. The authentication server 135 also assists the particular node that is authenticating to establish a trust relationship with its neighbor nodes by distributing a session master key material that is encrypted to the R0KHs 140. The R0KHs 140 derive level zero and level one Pairwise Master Keys (PMK_0, PMK_1). The R0KH 140 also keeps PMK_0 and sends PMK_1 to the authenticator MAP 105 or IAP 110 which is taking the role of a level one key holder. In some deployments of the present invention, when the IP layer communication channels are used for the R0KHs 140-n and R1KH 145-n, the R0KHs 140-n and R1KHs 145-n can be located in different layer 2 segments.

In one embodiment of the present invention, the wireless mesh network 100 incorporates IEEE 802.11r operability. 802.11r provides for fast BSS ("Basic Service Set") transitions (FT). 802.11r thus facilitates connectivity aboard vehicles in motion, with fast handoffs from one base station to another managed in a seamless manner. The primary application currently envisioned for the 802.11r standard is VoIP ("voice over IP", or Internet-based telephony) via mobile telephones designed to work with wireless Internet networks, instead of (or in addition to) standard cellular networks. 802.11r refines the transition process of a mobile client as it moves between access points (MAPs 105 or IAPs 110). The protocol allows a wireless client (MAPs 105 or STAs 115) to establish a security and quality of service (QoS) state at a new access point before making a transition, which leads to minimal connectivity loss and application disruption. The overall changes to the protocol do not introduce any new security vulnerabilities. This preserves the behavior of current stations and access points. 802.11r provides mechanisms for roaming mobile clients to communicate with candidate access points, establish security associations and reserve QoS resources.

Node Components

Figure 2:
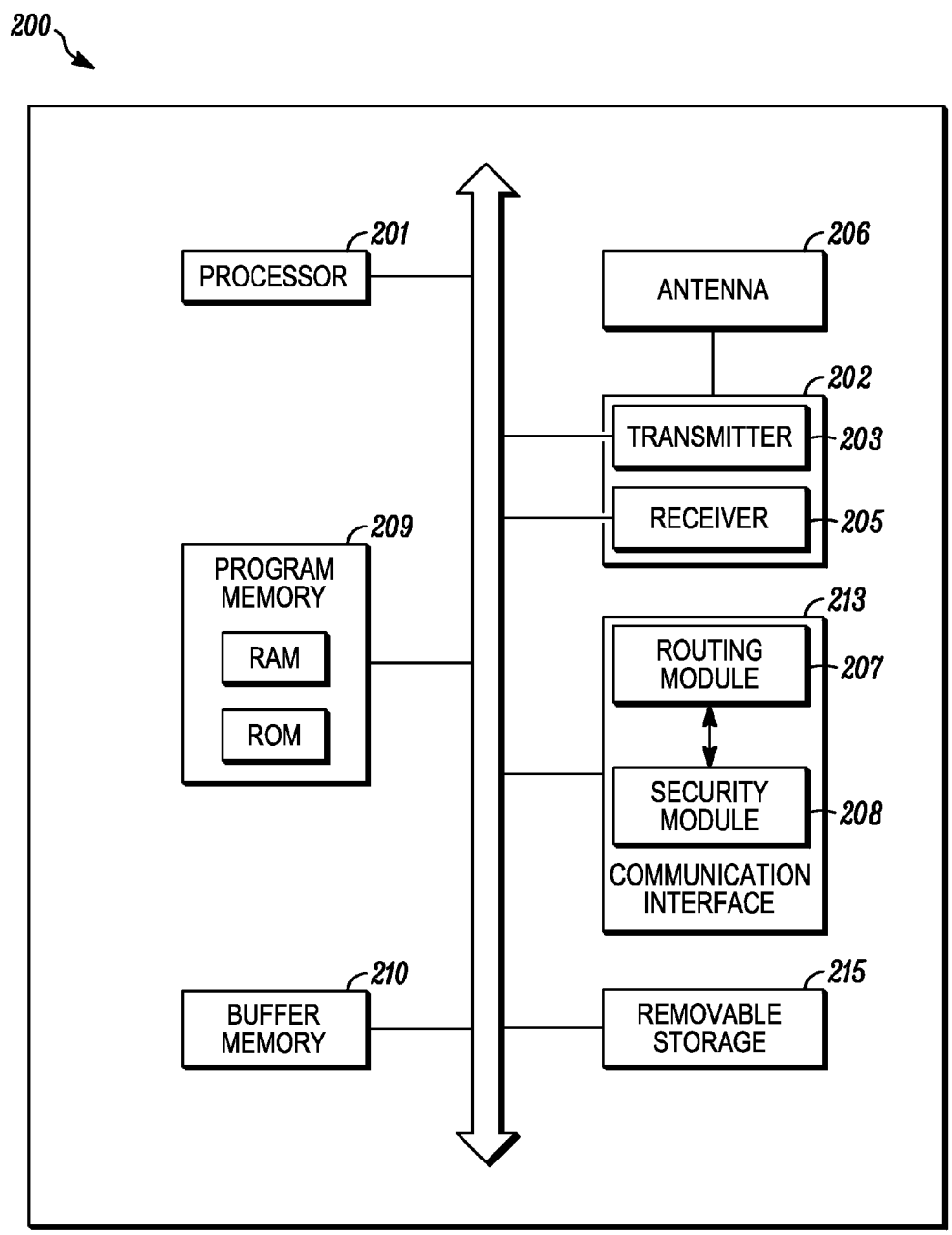
FIG. 2 is a block diagram illustrating a node employed in the communication network shown in FIG. 1.

FIG. 2 is a block diagram of a node 200 according to one implementation of the present invention. The node 200 can be implemented in MAPs 105 and IAPs 110. The node 200 comprises a processor 201, a transceiver 202 including a transmitter circuitry 203 and a receiver circuitry 205, an antenna 206, a program memory 209 for storing operating instructions that are executed by the processor 201, a buffer memory 210, and one or more communication interfaces including a communication interface 213 comprising a routing module 207 and a security module 208. Although not shown, the node 200 also can include an antenna switch, duplexer, circulator, or other highly isolative means (not shown) for intermittently providing information packets from the transmitter circuitry 203 to the antenna 206 and from the antenna 206 to the receiver circuitry 205. The node 200 is an integrated unit containing at least all the elements depicted in FIG. 2, as well as any other elements necessary for the node 200 to perform its particular electronic function. Alternatively, the node 200 can comprise a collection of appropriately interconnected units or devices, wherein such units or devices perform functions that are equivalent to the functions performed by the elements of the node 200.

The processor 201 includes one or more microprocessors, microcontrollers, DSPs (digital signal processors), state machines, logic circuitry, or any other device or devices that process information based on operational or programming instructions. Such operational or programming instructions are stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 201 has one or more of its functions performed by a state machine or logic circuitry, the program memory 209 containing the corresponding operational instructions can be embedded within the state machine or logic circuitry. The operations performed by the processor 201 and the other elements of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include appropriate, conventional circuitry to enable digital or analog transmissions over a wireless communication channel. The transmitter circuitry 203 and the receiver circuitry 205 can operate over an ad hoc networking air interface (e.g., Bluetooth, IEEE 802.11, IEEE 802.15, and the like).

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. One of ordinary skill in the art will recognize that most, if not all, of the functions of the transmitter circuitry 203 and/or the receiver circuitry 205 can be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one frequency band and optionally multiple frequency bands, when, for example, the communications with a proximate device are in a frequency band other than that of the network communications. The receiver circuitry 205 can optionally comprise a first receiver and a second receiver, or one receiver capable of receiving in two or more frequency bands. The receiver 205, depending on the mode of operation, can be tuned to receive, for example, Bluetooth or wireless local area network (WLAN), such as IEEE 802.11, communication signals. The transceiver 202 includes at least one set of transmitter circuitry 203. The at least one transmitter 203 can be capable of transmitting to multiple devices potentially in multiple frequency bands.

The antenna 206 comprises any known or developed structure for radiating and receiving electromagnetic energy in the frequency range containing the wireless carrier frequencies.

The buffer memory 210 can be any form of volatile memory, such as random access memory (RAM), and is used for temporarily storing received information packets in accordance with the present invention.

As illustrated in FIG. 2, a communication interface 213 includes a routing module 207 and a security module 208. The routing module 207 and the security module 208 are communicatively coupled. The routing module 207 triggers establishment of security associations based on attributes in a neighbor node table. Depending upon the implementation, some examples of some of the attributes stored in the neighbor node table include a neighbor node list, an active route list and a proxy list, and parameters such as Link Quality Measurements (LQMs) (which account for the quality of a wireless link with the particular neighbor node), routing metrics (which account for metrics along a route to the particular neighbor node), mobility domain information comprising a mobility domain identifier, for example mobility domain identifier of mobility domain A in the wireless mesh network 100 of FIG. 1, advertised by the particular neighbor node, mobility information about the particular neighbor node; and security association state information. The routing module 207 controls which neighbor nodes the security module 208 establishes security associations with. Instead of using a MAC Layer Management Entity (MLME) to establish security associations, the establishment of security associations (to specific neighbor nodes in a mesh network) can be triggered based on the routing module's observation of a set of attributes in a neighbor node table. For example, in one implementation, the routing module 207 triggers the security module 208 to establish security associations to specific neighbors based on attributes such as Link Quality Measurements (LQMs), routing metrics, mobility domain information, mobility information about the pair of peer nodes (e.g., fixed or mobile) and whether or not a security association is already established with a neighbor node. Thus, these security association establishment techniques are not dependent on the MLME or its association and open authentication states.

Propagation of R0KHs

Figure 3:
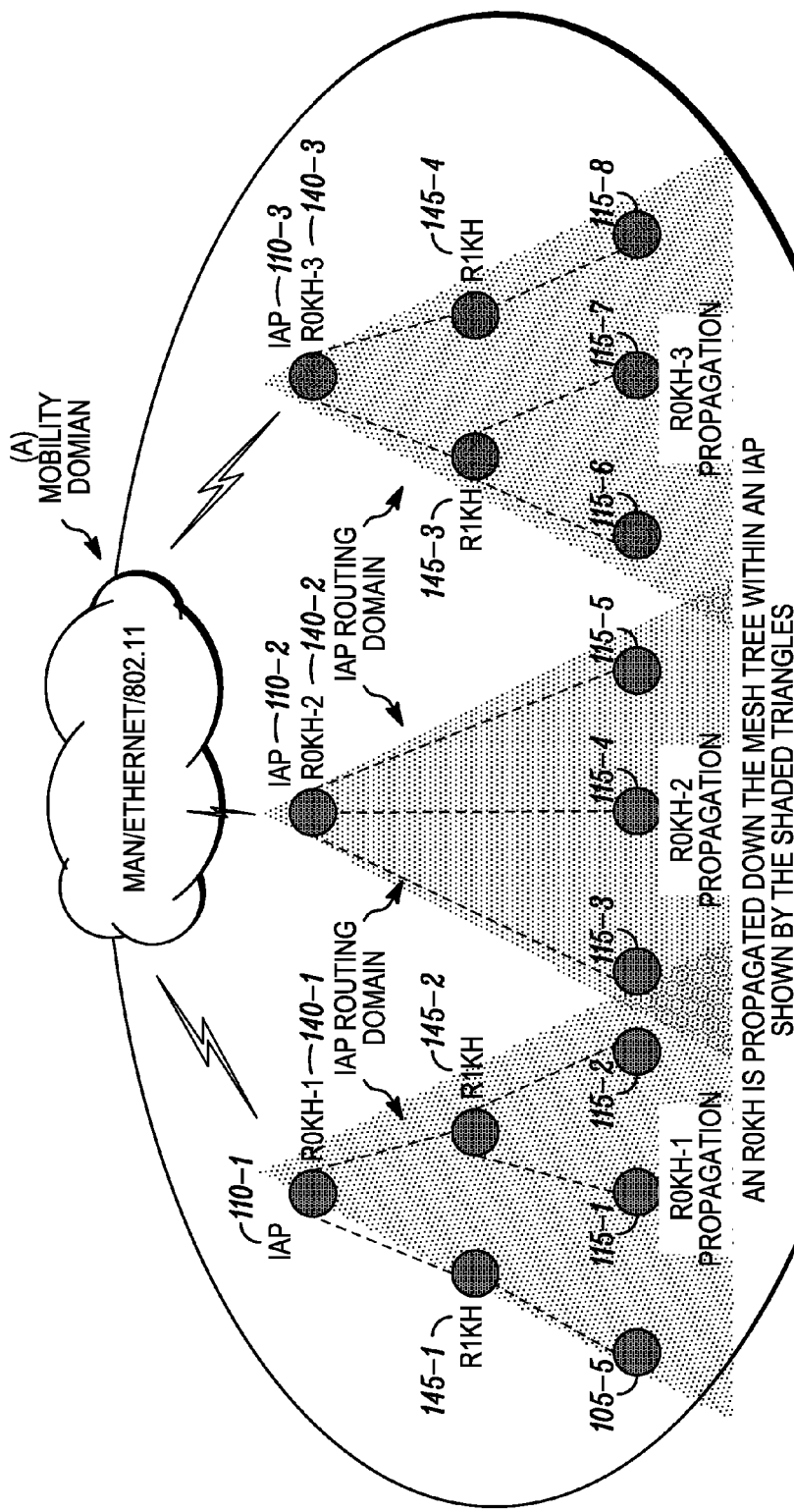
FIG. 3 illustrates propagation of identity of first level key holders within an Intelligent Access Point (IAP) routing domain of a mobility domain in accordance with some embodiments of the present invention.

FIG. 3 illustrates propagation of identity of R0KHs within an IAP routing domain of a mobility domain, for example mobility domain A of the wireless mesh network 100 of FIG. 1. As shown in FIG. 3, the identity of the R0KHs 140-$n$ is configured in IAPs 110-$n$. In another embodiment, the identity of the R0KHs 140-$n$ is configured in a central server (not shown) within the RAN.

Figure 4:
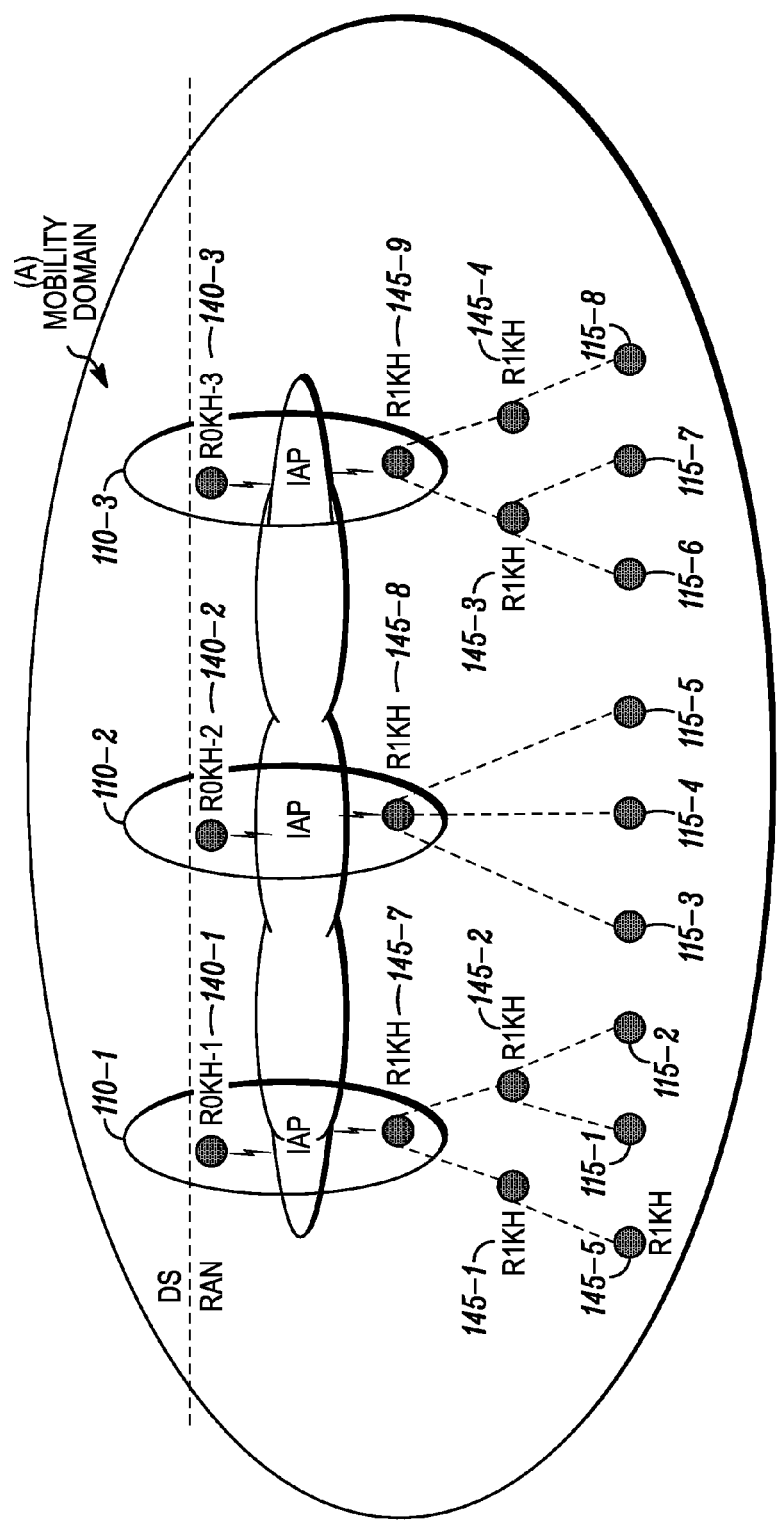
FIG. 4 illustrates propagation of identity of first level key holders within an IAP routing domain of a mobility domain, wherein all the IAPs contain both R0KH and R1KH, in accordance with some embodiments of the present invention.

Now referring to FIG. 4, according to one implementation of the present invention, all the IAPs 110-1 through 110-3 within the mobility domain A can contain both R0KH (R0KHs 140-1 through 140-3) and R1KH (R1KH 145-7 through 145-9). Further, each R1KH component 145 can have multiple R0KH parents 140 i.e. during a fast handoff, an R1KH 145 can communicate with any R0KH 140 within the mobility domain A.

Now referring back to FIG. 3, the identity of each of the first level key holders 140-$n$ and the mobility domain identifier is propagated through the wireless mesh network 100 to enable the supplicants within the mobility domain A to perform fast secure handoff. In one embodiment, the propagation of the R0KH identifiers 140-$n$ is limited to a mesh routing domain within the RAN. For example, when the first level key holders 140-$n$ are located in the IAPs 110-$n$, the propagation of the R0KH identifiers 140-$n$ is limited to the mesh routing domain (illustrated as shaded triangle in FIG. 3) of a single IAP 110 (referred to as IAP routing domain). For example, as shown in FIG. 3, the propagation of R0KH identifier 140-1 is limited to the routing domain of IAP 110-1, the propagation of R0KH-2 identifier is limited to the routing domain of IAP 110-2, and the propagation of R0KH-3 identifier is limited to the routing domain of IAP 110-3.

Each of the IAPs 110-$n$ can propagate the mobility domain identifier and the identity of R0KH 140 with which it is associated by advertising the mobility domain identifier and identity of the R0KHs within beacons per 802.11r. One or more of the MAPs 105-$n$ may receive the mobility domain identifier and the identity of R0KHs 140-$n$ and propagate the mobility domain identifier and identity of the first level key holders 140-$n$ after establishing security association with the R0KHs 140-$n$. In one embodiment, the mobility domain identifier of the mobility domain is propagated using a mobility domain information element (MDIE) and the identity of the R0KH is propagated using a fast transition information element (FTIE).

Mobility Domain Information Element

Figure 5:
FIG. 5 illustrates a frame structure of a mobility domain information element.

Referring to FIG. 5, a frame structure of the mobility domain information element (MDIE) 500 is shown. The MAPs 105 or IAPs 110 use the MDIE 500 to advertise that it is included in the group of MAPs 105 and/or IAPs 110 that constitute the mobility domain A, to advertise its support for Fast BSS transition capability. According to one implementation of the present invention, the MDIE 500 contains an element identifier 510, a length 520, a mobility domain identifier 530, and a fast BSS transition capability 540. The element identifier 510 identifies the MDIE 500. The length field 520 defines the length of the MDIE 500. The mobility domain identifier 530 identifies the mobility domain A with which the MAPs 105 or IAPs 110 are currently associated with. The Fast BSS transition capability field 540 defines whether the MAPs 105 or IAPs 110 support fast BSS transition within the mobility domain A.

Fast Transition Information Element

Figure 6:
FIG. 6 illustrates a frame structure of a fast transition information element.

Referring to FIG. 6, a frame structure of the fast transition information element (FTIE) 600 is shown. According to one implementation of the present invention, the FTIE 600 includes an element identifier 610, a length 620, a R0KH identifier 630, and a R1KH identifier 640. The element identifier 610 identifies the FTIE 600. The length field 620 defines the length of the FTIE 600. The R0KH identifier 630 indicates the PMK-R0 key holder that will be utilized by the supplicants. The R1KH identifier 640 is optional and indicates the MAPs 105 or IAPs 110 key holder identity which will be used by the supplicants.

Figure 7:
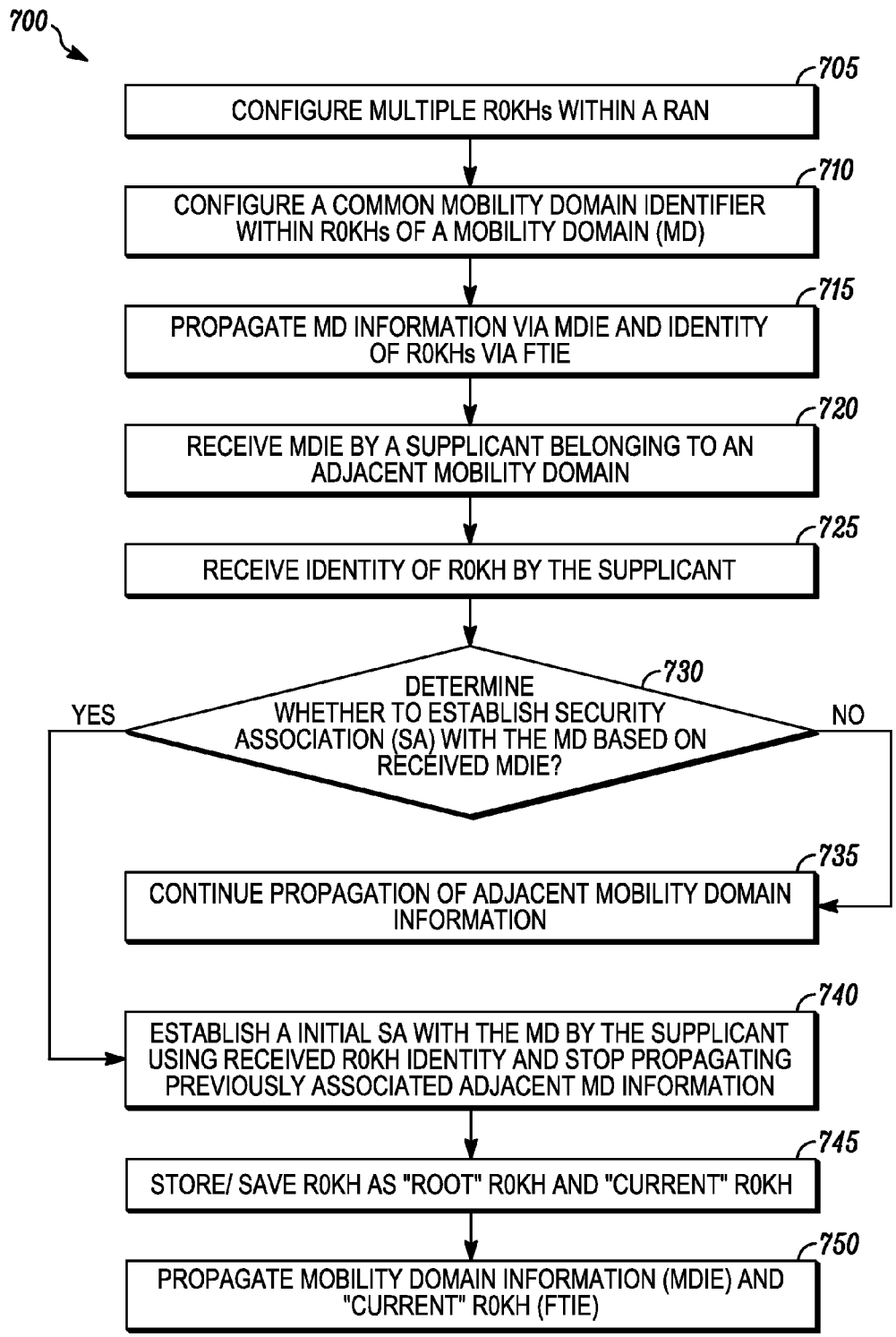
FIG. 7 is a flowchart illustrating a method for providing fast secure handoff in the communication network of FIG. 1.

Now referring to FIG. 7, a flowchart illustrating a method 700 for providing fast secure handoff in a wireless mesh network 100 of FIG. 1, according to one implementation of the present invention is shown. The method 700 begins with configuring multiple R0KHs 140 within a RAN, at step 705. In one embodiment, configuring the R0KHs 140 within the RAN comprises configuring the identity of each of the R0KHs 140 in IAPs 110 of the wireless mesh network 100. In another embodiment, configuring the R0KHs 140 within the RAN comprises configuring the identity of each of R0KHs 140 in the central server within the RAN of the wireless mesh network 100.

The method 700 further comprises configuring a common mobility domain identifier within the R0KHs 140 of a mobility domain A as shown in step 710 i.e. all the R0KHs 140 that constitute the mobility domain A is configured with the common mobility domain identifier. At step 715, propagating identity of a R0KH 140, for example via FTIE 600, and the mobility domain identifier, for example via MDIE 500 through the wireless mesh network 100. When the IAPs 110 are configured with R0KHs 140, the IAPs 110 can propagate the mobility domain identifier and identity of their respective R0KHs 140. In this case, the propagation of the R0KH identifier is limited to the mesh routing domain. At step 720, a supplicant, for example, mobile MAPs 105 or STAs 115 belonging to an adjacent mobility domain B of the wireless mesh network 100 receives the propagated MDIE, and subsequently identity of the R0KH 140 at step 725.

At step 730, the supplicant determines whether to establish security association with the mobility domain A based on the received mobility domain information. If the supplicant decides to not establish the security association with the mobility domain A, then at step 735, the supplicant continues to propagate adjacent mobility domain information i.e. the mobility domain B with which the supplicant is currently associated with. In one embodiment, the supplicant can decide not to establish security association with the mobility domain A when the mobility domain A does not support the fast BSS transition.

Referring back to step 730, in one embodiment, the supplicant determines whether to establish security association with the mobility domain based on the fast BSS transition capability of the mobility domain, and if the mobility domain A supports the fast BSS transition, then at step 740, the supplicant establishes an initial security association with the mobility domain A and stops propagating the mobility domain information of its previously associated adjacent mobility domain B. Next at step 745, the supplicant stores or saves the R0KH 140 as "root" R0KH. As used herein, the term "root" R0KH indicates identity of the R0KH within a mobility domain that a client initially establishes security association with. In addition, the supplicant stores or saves the R0KH 140 as "current" R0KH. As used herein, the term "current" R0KH indicates the identity of the R0KH security domain that a client currently resides within. Next, at step 750, the supplicant (MAP 105) starts propagating the mobility domain information (MDIE) of the mobility domain A and identity (FTIE) of the R0KH 140 with which the supplicant is currently associated to enable other supplicants moving within the mobility domain A to perform fast secure handoff. As it will be appreciated by a person skilled in the art, the step 750 can be periodically repeated to propagate the mobility domain information in order to enable supplicants moving within the mobility domain to perform fast secure handoff at different points of time.

Figure 8:
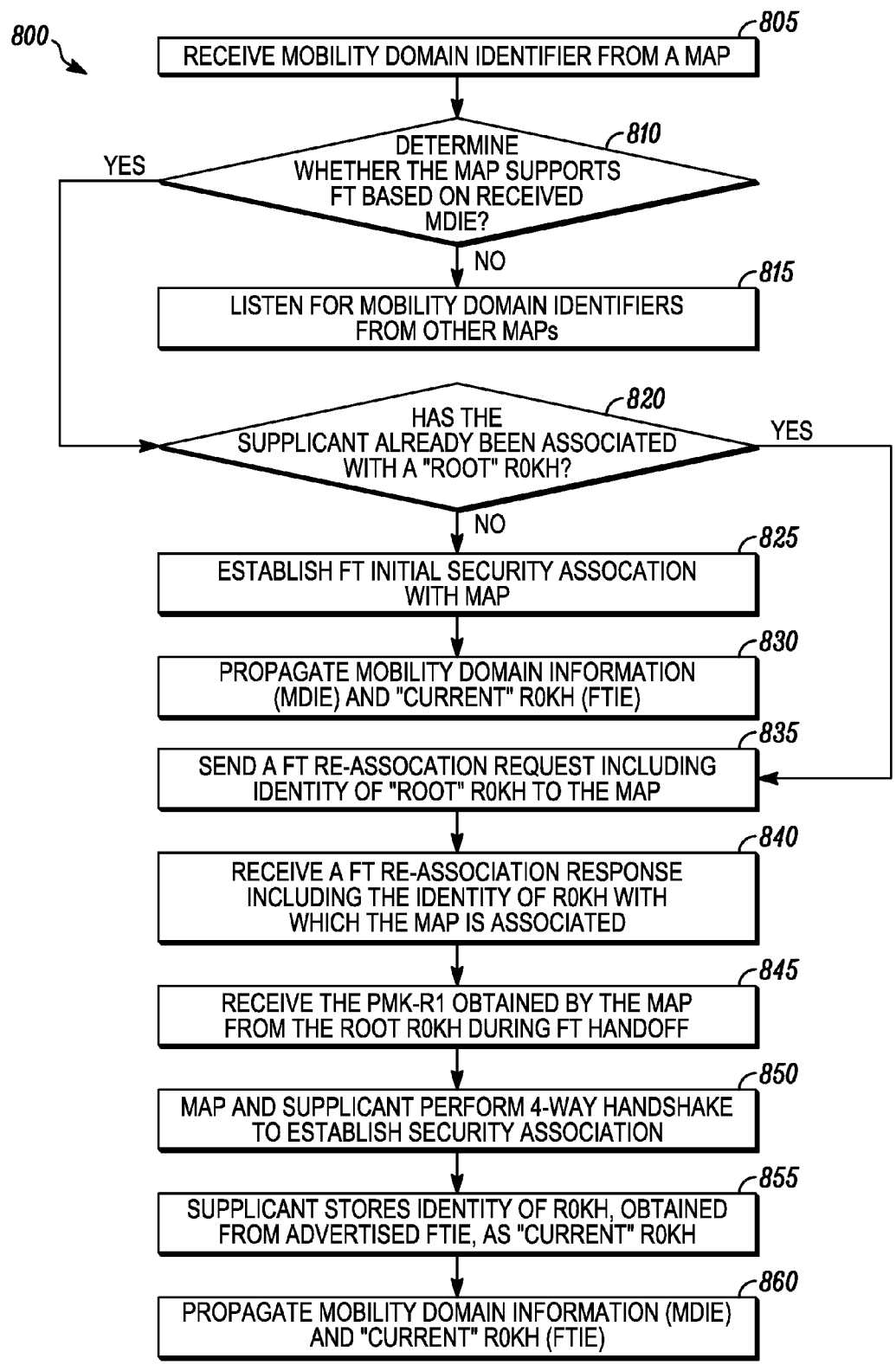
FIG. 8 is a flowchart illustrating example of operations performed by a supplicant for establishing security association with a mesh access point in accordance with some embodiments of the present invention.

FIG. 8 illustrates an example of operations 800 performed by a supplicant, for example, a supplicant MAP 105-5 to establish security association with a MAP 105-n within the mobility domain A of the wireless mesh network 100. At step 805, the supplicant MAP 105-5 receives MDIE 500 containing the mobility domain identifier from the MAP 105 e.g. MAP 105-1. At step 810, the supplicant MAP 105-5 determines whether the MAP 105-1 supports fast BSS transition (FT) based on the received MDIE 500. If the MAP 105-1 does not support fast BSS transition, the supplicant MAP 105-5 continues to listen for mobility domain identifiers from other MAPs 105-2 through 105-n as shown in step 815. Referring back to step 810, if the supplicant MAP 105-5 determines that the MAP 105-1 supports fast BSS transition, then at step 820, the supplicant MAP 105-5 checks whether it has already been associated with a "root" R0KH in mobility domain A, e.g. R0KH 140-2. When the supplicant is not already associated with a "root" R0KH in mobility domain A, then at step 825, the supplicant performs FT initial security association with the MAP 105-1 establishing R0KH-1 as its "root" and "current" R0KH for mobility domain A and starts propagating the mobility domain information (MDIE) and key holder information (FTIE) at step 830.

Referring back to step 820, when the supplicant MAP 105-5 determines that it is already associated with a "root" R0KH in Mobility Domain A, e.g. R0KH 140-2, then at step 835, the supplicant sends a FT re-association request including identity of the "root" R0KH 140-2 to the MAP 105-1. As it will be appreciated by a person skilled in the art, the MAP 105-1 can access the "root" R0KH 140-2 and obtain the PMK-R1 to enable the supplicant to complete the FT handoff (as describe in subsequent step 845). Next, at step 840, the supplicant MAP 105-5 receives a FT re-association response including the identity of R0KH 140-1 with which the MAP 105-1 is currently associated. At step 845, the MAP 105-1 receives PMK-R1 from the "root" R0KH 140-2 during FT handoff. After receiving the PMK-R1 key, the MAP 105-1 establishes security association with the supplicant MAP 105-5 by performing 4-way handshake with the supplicant MAP 105-5 as shown in step 850.

After the supplicant MAP 105-5 establishes security association with the MAP 105-1, at step 855, the supplicant MAP 105-5 stores the identity of the R0KH 140-1 being advertised by MAP 105-1 with which the supplicant MAP 105-5 is currently associated as "current" R0KH. At step 860, the supplicant MAP 105-5 starts propagating the mobility domain information (MDIE) and the "current" R0KH (FTIE) throughout its routing domain. As it will be appreciated by a person skilled in the art, the supplicant MAP 105-5 can periodically propagate the "current" R0KH to enable other supplicants e.g. STAs 115-2 through 115-n to join the wireless mesh network 100.

Figure 9:
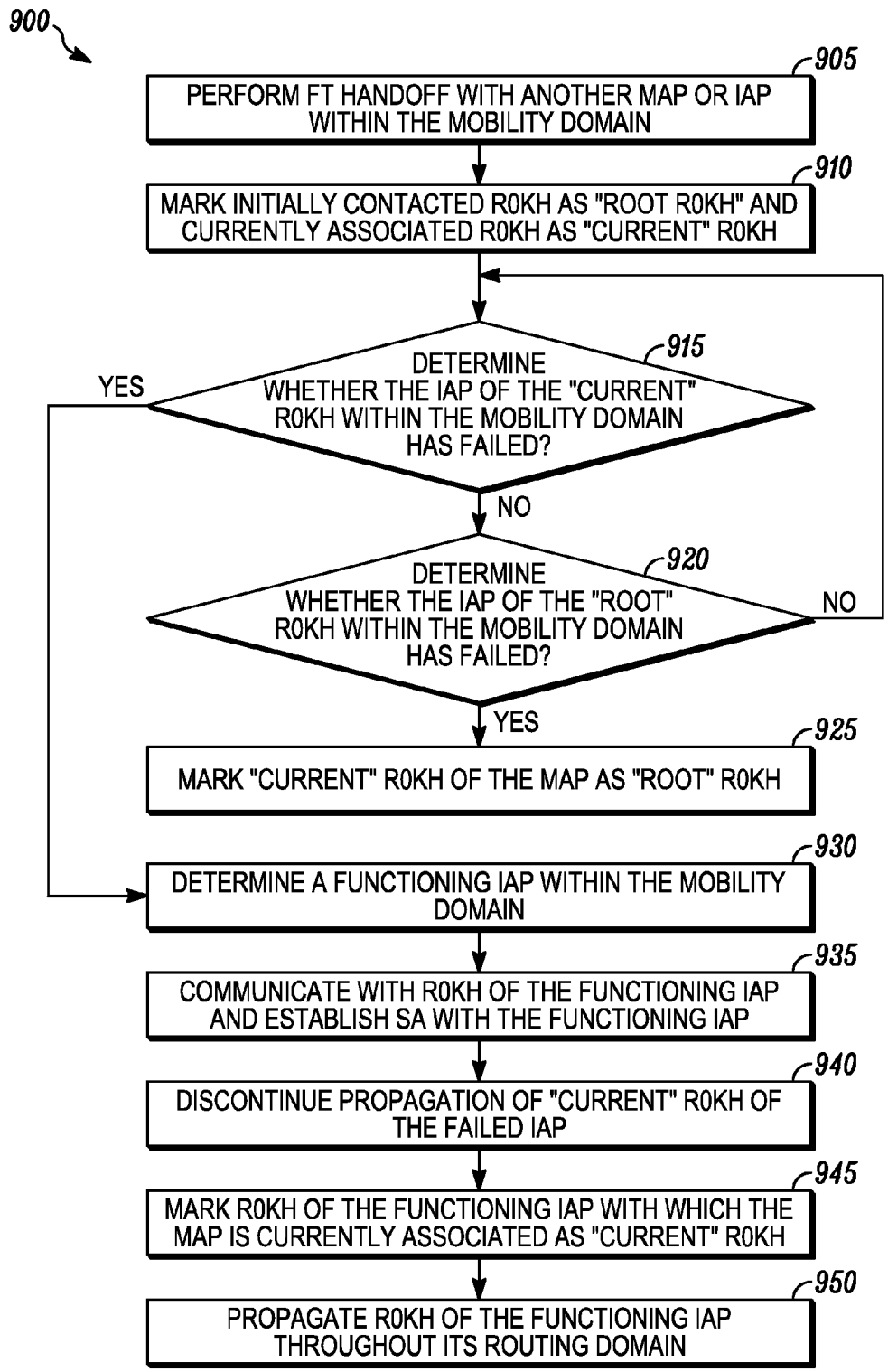
FIG. 9 is a flowchart illustrating ability of an R1KH to "attach" to a functioning R0KH when a "current" R0KH fails.

Referring to FIG. 9, a flowchart illustrating example of operations 900 associated with ability of R1KH to "attach" to a functioning R0KH when the R1KH detects a failure in current "R0KH". At Step 905, a supplicant performs FT handoff with another MAP 105 or IAP 110 within the mobility domain. After establishing security association, at step 910, the supplicant marks the initially contacted R0KH as "root" R0KH and currently associated R0KH as "current" R0KH. Next, at step 915, the supplicant determines whether the IAP of the "current" R0KH has failed. When the supplicant determines that the "current" R0KH is functioning, the supplicant proceeds to step 920 to determine whether the IAP of the "root" R0KH within the mobility domain has failed. When the supplicant detects a failure of the IAP of the "root" R0KH, the supplicant marks "current" R0KH as "root" R0KH as shown in step 925. Then, during periodic refresh of the security association the supplicant will use the new root R0KH rather than the failed R0KH. When the supplicant determines that the IAP of the "root" R0KH is functioning, the supplicant proceeds to step 915 and periodically checks for the functioning of the IAP of the "current" R0KH.

Referring back to step 915, when the supplicant detects the failure of the IAP associated with the current R0KH, at step 930, the supplicant determines a functioning IAP within the mobility domain and communicates with the R0KH of the functioning IAP and establishes security association with the functioning IAP as shown in step 935. After the supplicant establishes security association with the functioning IAP, the supplicant discontinues the propagation of identity of R0KH of the failed IAP as shown in step 940, and proceeds to step 945 to mark R0KH of the functioning IAP with which the MAP is currently associated as "current" R0KH at step 945. Next, at step 950, the supplicant propagates R0KH of the functioning IAP throughout the mesh routing domain. As it will be appreciated by a person skilled in the art, the supplicant can periodically propagate the R0KH of the functioning IAP to enable other supplicants to join the wireless mesh network 100.

Applications

Some of the applications of the present invention are described below.

The present invention provides for the applying of mobility domains to a mesh network and defines propagation of a mobility domain identifier of the mobility domain within an IAP routing domain, thereby extending IEEE 802.11r concepts to wide area mesh networks. Some of the basic functions that can be augmented for mesh networks using the teachings of the present invention are a) a mechanism to detect when a mobile device hands off to a new IP subnet. This is necessary so that the mobile device knows when it should use Dynamic Host Configuration Protocol (DHCP) to acquire a new topologically correct Internet Protocol (IP) address. The propagation of mobility domain information via MDIE can be used for this purpose; b) a mechanism to establish a security association with the new access point based on the propagation of identity of the first level key holders via FTIE in accordance with some embodiments of the present invention, which allows new security associations to be established without communicating all the way back to the authentication server, e.g. RADIUS (Remote Authentication Dial In User Service) server; and c) a mechanism to minimize the opportunity for a single point of failure, especially in public safety systems (e.g. systems operating at 4.9 GHz spectrum that allows high power devices with ranges much greater than 50 meters e.g. 300 meters) based on the distributed R0KHs among all the IAPs according to the implementations of the present invention.

The present invention further improves the system availability as described below.

For example, whenever an IAP fails, the wireless mesh network 100 self-heals creating routes around the failed IAP to a functioning IAP as described by the flowchart of FIG. 9. Thus during a R0KH failure, any new client that is attempting to access to the wireless mesh network will automatically be routed around the failed IAP-R0KH to a functioning IAP-R0KH. The functioning IAP-R0KH will become the clients "root" R0KH.

In another scenario, whenever an R0KH fails, the wireless mesh network 100 self heals by creating a route around the failed IAP. The consequence of the failure occurs when a client performs a handoff to a newly visited R0KH. If the R1KH does not have cached keying material from a previous client visit, the R1KH will attempt to communicate with the R0KH to obtain the proper security information. Unfortunately, if the R0KH is nonfunctioning, then the communication will fail in which case the handoff will be denied due to inability to reach the R0KH. However because R0KHs are distributed and advertised within a routing domain, the client can adopt the "current" R0KH as its "root" R0KH and then re-authenticate to the network via its new R0KH. Though there may be a delay in this handoff, the client and system quickly and smoothly recover from the failed R0KH. A similar scenario can occur for devices whose security associations expire. For example, if a security association is about to expire and communication to the failed R0KH is necessary to refresh the security association, the refresh will fail. This results in the selection of a new R0KH in accordance with the present invention. Thus the present invention improves the system availability in mesh networks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing fast secure handoff in a wireless mesh network, comprising:
    configuring a plurality of access points as first level key holders (R0KHs) within a radio access network to which one or more supplicants within the wireless mesh network are capable of establishing a security association;
    configuring a common mobility domain identifier within the configured plurality of first level key holders access points of a mobility domain;
    propagating identity of a first level key holder access point and the mobility domain identifier of the mobility domain through the wireless mesh network to enable the one or more supplicants within the mobility domain to perform fast secure handoff;
    recording one of the configured plurality of first level key holder access point of the mobility domain as a "root" first level key holder when the one or more supplicant initially establishes security association with the mobility domain;
    recording one of the configured plurality of first level key holder access point as a "current" first level key holder when the one or more supplicant has already established a security association within the mobility domain; and
    determining whether the "current" first level key holder access point in the mobility domain has failed and
        on determining that the "current" first level key holder access point has failed further determining another one of the plurality of first level key holder access point within the mobility domain and marking the another one of the plurality of first level key holder access point as the "current" first level key holder access point, or
        on determining that the "current" first level key holder access point has not failed further determining that the "root" first level key holder access point has failed and marking the "current" first level key holder access point as the "root" first level key holder access point.

2. The method of claim 1, wherein configuring the plurality of access points as R0KHs within the radio access network comprises configuring the identity of each of the R0KHs in intelligent access points (IAPs).

3. The method of claim 1, wherein configuring the plurality of access points as R0KHs within the radio access network comprises configuring the identity of at least one of the R0KHs in a central server.

4. The method of claim 1, wherein the propagation of the identity of the first level key holder access point is limited to a routing domain of a single intelligent access point (IAP) when the first level key holder access point is configured in the IAP.

5. The method of claim 1, wherein propagating identity of the first level key holder access point and the mobility domain identifier comprises receiving and forwarding the identity of the first level key holder access point and the mobility domain identifier by a mesh access point when the mesh access point is associated with the first level key holder access point.

6. The method of claim 1, wherein propagating mobility domain identifier of the mobility domain comprises propagating using a mobility domain information element (MDIE).

7. The method of claim 1, wherein propagating identity of the first level key holder access point comprises propagating using a fast transition information element (FTIE).

8. The method of claim 1, further comprising determining, by a supplicant, fast handoff opportunities based on the propagation of the mobility domain identifier.

9. The method of claim 8, wherein the supplicant analyses the mobility domain identifier advertised by the mesh access points to determine fast handoff targets, which are identified as being in the same mobility domain as the supplicant.

10. A method for providing fast secure handoff in a wireless mesh network, comprising:
   configuring a plurality of access points as first level key holders (R0KHs) in at least one of a plurality of mobility domains within a radio access network;
   configuring a common mobility domain identifier within each of the configured plurality of first level key holder access points in the at least one mobility domain;
   establishing, by a supplicant, an initial security association with an authenticator associated with a first level key holder access point in the at least one mobility domain based on an information propagated by the authenticator, the information including identity of the first level key holder access point and the common mobility domain identifier of the at least one mobility domain; and
   recording, by the supplicant, the first level key holder access point as a root first level key holder access point after establishing the initial security association with the authenticator associated with the first level key holder access point;
   establishing, by the supplicant, a fast security association with at least one other authenticator associated with at least one other first level key holder access point in the at least one mobility domain based on an information propagated by the at least one other authenticator, the information including identity of the at least one other first level key holder access point and the common mobility domain identifier of the at least one mobility domain; and
   recording, by the supplicant, the at least one other first level key holder access point as a current first level key holder access point after establishing the fast security association with the at least one other authenticator associated with the at least one other first level key holder access point.

11. The method of claim 10, wherein the supplicant is a mesh access point and further comprising propagating, by the mesh access point, identity of the current first level key holder access point and the common mobility identifier of the at least one mobility domain to enable other supplicants to establish a security association with the mesh access point.

12. The method of claim 10, wherein establishing the fast security association further comprises:
   sending, by the supplicant, an association request including identity of the first level key holder access point to the at least one other authenticator;
   receiving, by the supplicant, an association response including identity of the at least one other first level holder access point from the at least one other authenticator,
   wherein the at least one other authenticator obtains a key from the first level holder for the supplicant to complete the fast security association.

13. The method of claim 10, wherein the at least one other authenticator is a mesh access point and further comprising configuring the mesh access point as a second level key holder (R1KH) when the mesh access point establishes a security association with one of the first level key holder access points in the at least one mobility domain.

14. The method of claim 13, wherein the second level key holder mesh access point is capable of communicating with each of the first level key holders access points in the at least one mobility domain.

15. The method of claim 14, wherein the second level key holder mesh access point communicates with the first level key holder access point to obtain a level one pairwise master key (PMK-R1) and performs a 4-way handshake with the supplicant to complete the fast security association with the supplicant.

* * * * *